UNITED STATES PATENT OFFICE.

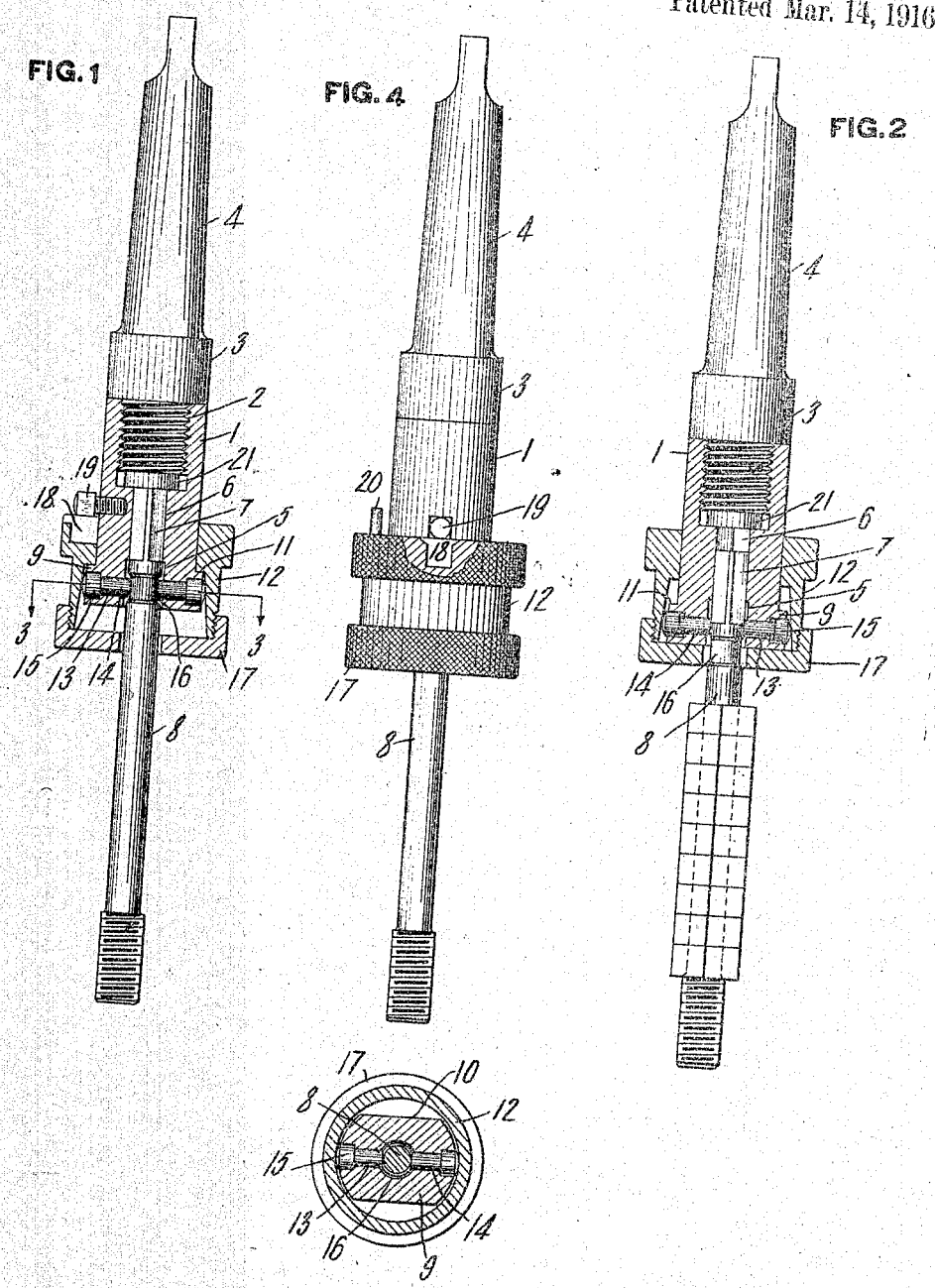

FREDERICK LACKNER, OF PITTSBURGH, PENNSYLVANIA.

CHUCK.

1,174,997. Specification of Letters Patent. Patented Mar. 14, 1916.

Application filed July 29, 1914. Serial No. 853,876.

*To all whom it may concern:*

Be it known that I, FREDERICK LACKNER, a resident of Pittsburgh, in the county of Allegheny and State of Pennsylvania, have invented a new and useful Improvement in Chucks, of which the following is a specification.

This invention relates to tool chucks or holders, and particularly to chucks for holding and rotating taps and other similar tools.

The object of the invention is to provide a tool chuck which automatically releases the tool therefrom after a given number of operations, and which chuck is automatically operated by the work itself, thereby requiring no special attention on the part of the operator, preventing the liability of injury in releasing the tool from the holder, and insuring stopping of the tapping or boring operation when the tool is filled and thus preventing injury to the tool.

A further object of the invention is to provide an improved chuck or tool holder of the class described which is of simple construction, which is positively operated, which does not depend upon the pressure of springs, which requires no hand manipulation other than that of inserting the tool into the holder, and which holder can be readily changed so as to operate in the usual manner of such tool holders, without the automatic feature, whenever desired.

The invention comprises the tool holder hereinafter described and claimed.

In the drawings, which represent one embodiment of the invention, Figure 1 is a sectional elevation showing a tap in the position in which it is rotated and held by the chuck; Fig. 2 is a similar view showing the tap being released from the chuck; Fig. 3 is a cross section on the line 3—3, Fig. 1; and Fig. 4 is a side elevation of the device partly broken out and in section, the parts being shown in the same position as in Fig. 1.

The chuck or tool holder shown in the drawings comprises a body member 1 provided with a bore 2 which is threaded at its upper end to enable the chuck to be screwed directly upon the rotating spindle of a drill press or other machine with which it is to be used. In the drawings the body member is shown as threaded to the lower end of a chuck holder 3, which has the usual tapered shank 4 provided with a suitable tang at its upper end and which shank is adapted to be inserted into a corresponding tapered socket in the drill press spindle, as will be readily understood. The lower portion of the bore of the body member 1 is shown as smaller than its upper portion, part of the reduced bore, indicated at 5, being cylindrical and part non-circular, that is, of square or other cross section, as indicated at 6, to receive the similarly shaped tang end 7 of the tool 8 for rotating the same. Said tool is shown as a tap to be used for threading nuts, although it is to be understood that any suitable drill, tap or other tool may be used with the chuck, as desired.

The lower end of the body member 1 is enlarged to form a head 9, which may be flattened on two or more sides, as shown at 10, if desired. Said head forms a shoulder 11 to receive and support the inner portion of the flange of a sleeve 12, which is slidably and rotatably mounted upon the outside of the body member 1 and which serves to operate the tool chuck, as will more fully hereinafter appear. The head 9 is provided with one or a plurality, two being shown, of radially extending openings 13, in which are located tool holding pins or abutments 14, shown as provided with shanks the inner ends of which project into the bore 5 of the body member, and having enlarged heads 15 on their outer ends working in sockets in the head of the body member, and which heads extend slightly beyond the peripheral surface of the head of the body member. The inner ends of the pins 14, when said pins occupy the position shown in Fig. 1, extend into an annular groove 16 in the shank of the tool 8, the shoulder at the upper end of said groove preventing the tool from dropping out of the chuck.

The inner surface of the rim or wall of the sleeve 12 is tapered and flares downwardly and outwardly, as shown in Fig. 1. Said sleeve is threaded at its lower end where it is provided with a cap 17 having a central bore through which the tool projects, the peripheral surface of said cap and of the flange at the upper end of the sleeve 12 being preferably knurled or roughened to enable the cap to be readily attached to or removed from the sleeve whenever desired.

At one side of the chuck the upper face of the flange of the sleeve 12 is hollowed out to provide a depression 18 for coöperation with a suitable abutment or stop 19 threaded into or otherwise secured to the outer surface of the body member 1, and which abutment also coöperates with a pin or projection 20 projecting upwardly from the sleeve 12, for a purpose which will more fully hereinafter appear. Preferably, also, a loose disk or block 21 is placed in the bottom of the larger portion of the bore of the body member 1, to receive the impact of the tool 8 when inserted into the chuck and prevent the same from damaging the lower end of the spindle 4.

In use of the tool holder the body member 1 is attached to the spindle of the drill press or other machine, or is fastened to the tapered spindle 4 which is inserted in the drill spindle of the machine, in the usual manner. The tool, such as the tap 8, is then inserted in the chuck from beneath and is forced upwardly to the position shown in Fig. 1, the sleeve 12 being held in its upper position, shown in Fig. 2, while the tool is inserted. When the tool reaches its seat the sleeve 12 is allowed to drop by gravity until it rests on the shoulder 11 of the body member 1, the inner beveled surface of its rim or wall acting as a cam or wedge to force the pins 14 inwardly to the position shown in Fig. 1, in which position their inner ends project into the annular groove 16 of the tool and prevent the same from dropping out. The machine is then started and the tool spindle is rotated and fed longitudinally in the usual manner to thread the tap through the article being operated upon, such as one of the nuts 22 shown in Fig. 2. As the tapping operation on each nut is finished the nut reaches the upper or blank portion of the shank of the tool, the machine spindle is retracted, another nut is fed into the operating position and a second tapping operation proceeds as before. The tap is usually provided with a shank having a blank portion long enough to hold a number of nuts, say ten or twelve. These nuts pile up successively upon the shank until the blank portion of the shank is full, whereupon, at the conclusion of the next tapping operation, the uppermost nut reaches the cap 17 and lifts said cap and the sleeve 12 from the shoulder 11. The weight of the tap and the nuts carried thereby is then sufficient to force the pins 14 radially outwardly, it being understood that the shoulder at the upper end of the annular groove 16 is slightly beveled and therefore acts as a cam or wedge against the ends of said pins. The tap and nuts carried thereby consequently drop out of the holder and the attendant removes the nuts and replaces the tap and the tapping operations proceed as before.

When the device is operating automatically, in the manner just described, the abutment 19 is located directly over the depression 18 in the sleeve 12 and permits said sleeve to rise to free the tool from the chuck. If it is desired to use the chuck in the ordinary manner, and without the automatic feature, the sleeve 12 is rotated upon the body member 1 until the abutment 19 strikes the pin 20, in which position said abutment is at one side of and cannot enter the depression 18. Consequently, the sleeve 12 cannot be lifted and the tool cannot be released from the chuck.

The chuck described is simple and is positive in operation. It requires no manual adjustment to release the tap from the tool and therefore does not injure the hands of the operator. Moreover, it does not require close attention, as the operator knows that the tool will be released from the chuck when filled with articles being operated upon and consequently does not have to be present to stop the machine when the tool is full. There are no projecting parts liable to catch in the clothing of workmen and no springs to wear out or break. Moreover, the device can be readily adapted for either automatic or manual operation by a simple turn of the operating sleeve.

What I claim is:—

1. A tool chuck, comprising a body member provided with a shoulder, a bore for receiving a tool, and movable tool holding pins, an abutment on said body member, and a sleeve resting on said shoulder and arranged to engage said pins and force the same into engagement with said tool, said sleeve being slidable upon said body member and provided with a depression to receive said abutment, and said sleeve and abutment being relatively movable around the axis of the sleeve to a position in which the release of the tool is prevented.

2. A tool chuck, comprising a body member, movable tool holding devices thereon, a movable member arranged in one position to hold said devices in engagement with the tool and in another position to release said devices from the tool, said movable member being so arranged as to be operated by the articles being operated upon for moving it to tool releasing position, and means carried by said body member for locking said movable member in tool holding position.

3. A tool chuck, comprising a body member provided with movable means arranged in one position to engage and support a tool, and a sleeve slidable upon said body member and arranged in one position to hold said movable means in engagement with the tool, said sleeve being arranged to be moved by the articles being operated upon to release the tool from the chuck, and means carried by said body member for locking said sleeve in tool holding position.

4. A tool chuck, comprising a body member provided with a shoulder, a tool receiving bore, and movable tool holding pins, a sleeve rotatable and longitudinally slidable upon said body member and arranged when seated against said shoulder to hold said pins in engagement with the tool, said sleeve being provided with a depression, and an abutment on the body member arranged to enter said depression when opposite the same and permit the sleeve to move longitudinally to release the tool and also arranged when said sleeve is rotated to a position where said abutment and depression are out of registration to lock the sleeve and pins in tool holding position and prevent release of said tool.

5. A tool chuck, comprising a body member provided with a shoulder, a tool receiving bore, and movable tool holding pins, a sleeve rotatable and longitudinally slidable upon said body member and arranged when seated against said shoulder to hold said pins in engagement with the tool, said sleeve being provided with a depression, an abutment on the body member arranged to enter said depression when opposite the same and permit the sleeve to move longitudinally to release the tool and also arranged when said sleeve is rotated to a position where said abutment and depression are out of registration to lock the sleeve and pins in tool holding position and prevent release of said tool, and a projection on said sleeve arranged to engage said abutment when said sleeve is rotated to said position.

In testimony whereof, I have hereunto set my hand.

FREDERICK LACKNER.

Witnesses:
　JOSEPH DIETERLE, Jr.,
　R. A. LACKNER.